Figure 1:
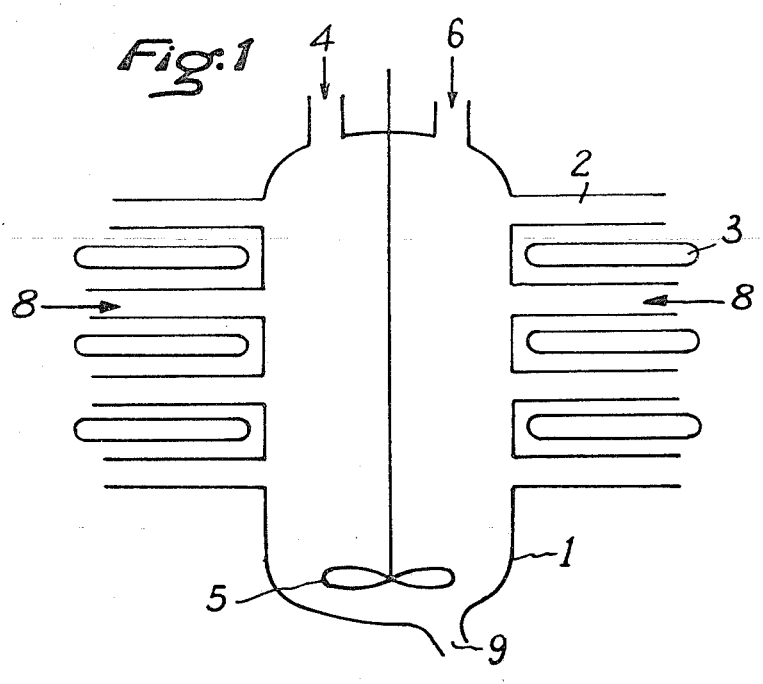

United States Patent [19]
Lucas

[11] 3,800,159
[45] Mar. 26, 1974

[54] PHOTOCHEMICAL APPARATUS

[75] Inventor: Georges Lucas, Paris, France

[73] Assignee: Societe Anonyme dite: Societe Nationale Des Petroles D'Aquitaine, Paris, France

[22] Filed: Feb. 29, 1972

[21] Appl. No.: 230,373

[30] Foreign Application Priority Data
Mar. 1, 1971 Great Britain .................... 71.06963

[52] U.S. Cl. .............................................. 250/527
[51] Int. Cl. .............................................. B01j 1/10
[58] Field of Search ......... 204/193, 157.1 R, 158 R, 204/158 HA, 162

[56] References Cited
UNITED STATES PATENTS
3,309,298   3/1967   Ito et al. ..................... 204/162 N X
3,345,140   10/1967  Saito et al. .................... 204/193 X Primary Examiner—Howard S. Williams

[57] ABSTRACT

A process for photo-oximating cycloalkanes by means of a gaseous nitrosating agent, in which the agent if fed into a radiation zone, without any cycloalkane present, the activated radicals are transferred immediately to an adjoining reaction zone containing the cycloalkane, and the oxime is provided in this reaction zone and drawn off.

The radiation zone is separated from reaction zone by a perforated or gas-permeable partition, such as an electroformed grid made from a corrosion-resistant metal or alloy.

Pressure is maintained in the radiation zone by means of a gas vehicle carrying the gaseous nitrosating agent, ensuring immediate transfer of the activated radicals and preventing any of the liquid phase in the radiation zone from leaking in.

7 Claims, 3 Drawing Figures

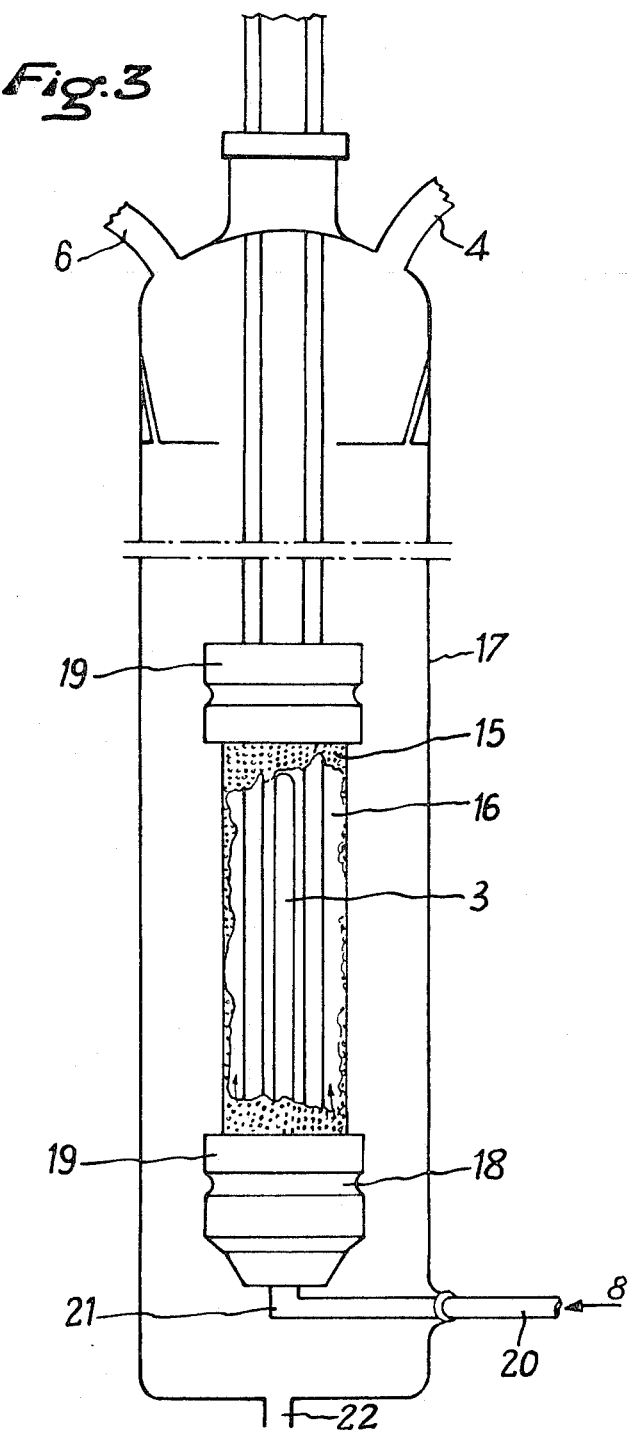

PHOTOCHEMICAL APPARATUS

Existing photochemical processes for oximating cycloalkanes consist of exposing a mixture containing the cycloalkane, in liquid form or in solution, and the nitrosating agent in the presence of excess hydrochloric acid, and possibly a carboxylic organic acid, or inorganic acid, to the effect of photonic energy emitted by one or more doped or undoped high-pressure mercury lamps, or another source of activation. These lamps are usually submerged in the reaction mixture, and it is found that, regardless of the proportions of reagents, the wavelengths, the transparent, waterproof coatings applied to the surfaces transmitting the light energy and in contact with the reaction mixture, or the method of extracting the reaction product, the reaction slows down considerably after a variable length of time, because of tarry deposits that form on the lamp covers. These deposits result from the simultaneous presence of the light source, nitrosating agent and cycloalkane inside the reactor.

Another drawback in existing processes is the need to remove excess heat occurring in the reaction mixture, the optimum reaction temperature being between 10° and 30°C.

This invention concerns a continuous cycloalkane oximation process that overcomes these drawbacks, in which oximation is achieved by means of a gaseous nitrosating agent fed into a radiation zone, without any cycloalkane present, the resulting dissociated activated particles of the agent being transferred immediately to an adjoining reaction zone containing the cycloalkane in liquid form, and from which the resulting oxime or oxime hydrochloride is drawn off.

The radiation zone is separated from the adjoining reaction zone by a perforated gas-permeable partition, and the nitrosating agent, mixed with a gas vehicle, is fed in at sufficient pressure to ensure immediate transfer of the active particles to the oximation zone, and prevent any traces of cycloalkane from leaking into the radiation zone.

The process according to the invention can therefore be performed continuously, in two simultaneous stages, the first solely photo-chemical, to dissociate the nitrosating agent into active particles:

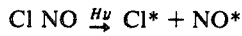

and the second chemical, involving the formation of a nitroso compound and its isomerization into oxime:

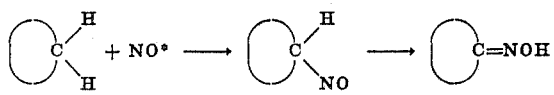

In this process, the cover of the light energy source is never in contact simultaneously with the cycloalkane and nitrosating agent, and since the combination of all three is needed for tarry deposits resulting from photo-degradation of the reagents and reaction products to form, no such deposits occur and the reaction is not slowed down.

This means that it is unnecessary to add any phase such as a sulphuric phase to the reaction mixture, to ensure continuous removal of the oxime or oxime salts that were deposited on the light-source covers in earlier processes.

It is also unnecessary to cool the reaction mixture, since scission of the nitrosating agent molecule is unaffected by heat. In addition, the gas circulating in the reaction zone cools the reaction mixture, as well as agitating it continually in a radial direction, drawing the oxime away from the gas-permeable separating partition (which is thus not clogged by it).

The radiation zone therefore contains a gas phase, which filters any harmful wavelengths, preventing them from passing through the permeable partition into the oximation zone.

Finally, the quantic efficiency of the photolysis of a gaseous nitrosating agent, such as nitrosyl chloride, is much higher in the gas phase: 2 in the gas phase, and 0.75 in a carbon tetrachloride solution (cf. Symposium on photo-chemistry, 1957, Heidt, Livingstone, Rabinowitch — New York, London, Wiley & Sons: The photolysis of nitrosyl chloride). Gas-phase photolysis allows far more active radicals to be liberated than in earlier processes.

The nitrosating agent generally belongs to the nitrosyl halides group, but a mixture of chlorine and nitrogen oxide can be used. It is fed into the radiation zone at sufficient pressure to ensure immediate transfer of the active particles, which, in the case of chlorine, have a life of $6 \times 10^{-3}$ seconds at 0.1 mm mercury pressure (cf. Sidgwick, *The Chemical Elements*, p. 1140-1955). However, the life of these active particles raises no problem, since radicals with an average life of $8 \times 10^{-3}$ seconds can be transported without becoming deactivated over a distance of 30 cm at a speed of 1,000 to 1,400 cm/sec (Paneth et al. Ber. 1929 — 62 — 1335). In order to obtain the necessary pressure in the radiation zone, while maintaining a predetermined NOCl concentration, the nitrosating agent may be conveyed by a gas vehicle, which may be inert, or may contribute to the reaction like hydrochloric acid.

The radiation zone, in which the nitrosating agent undergoes photochemical dissociation, may take various forms.

FIG. 1 shows a reactor made from an opaque, corrosion-resistant material such as polyvinyl chloride, in which the radiation and dissociation zones consist of pipes 2, which have capillary ends or which are obstructed cross-sectionally by a transparent screen made from Pyrex, quartz or fluorous resins. The light-radiation sources 3 are placed between these pipes. The cycloalkane, in liquid form or in solution, is injected through one inlet 4, and the hydrochloric acid through another 6, while a stirrer 5 ensures that the reaction mixture is homogeneous. The nitrosating agent 8, alone or carried by a vehicle consisting of nitrogen, argon, anhydrous hydrochloric acid or carbon tetrachloride, is injected and dissociated into activated particles in the pipes 2. These particles are transferred quickly to the actual chemical reactor 1.

Another embodiment consists of placing the light-sources 3 directly inside the pipes 2 carrying the nitrosating agent and its vehicle 8.

Figure 2:
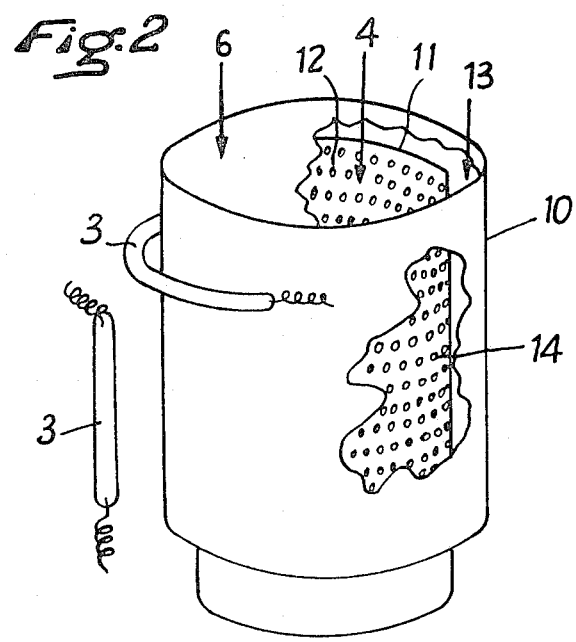

FIG. 2 shows a third embodiment, consisting of a reactor with a double casing. The outer casing 10 may be totally or partly transparent, while the inner casing 11, marking the boundary of the inner chemical reaction zone 12, consists of a perforated, opaque, corrosion-resistant material 14. The energy sources 3 are placed outside the outer casing 10, opposite the transparent sections, or between the two casings.

The nitrosating agent and its vehicle are fed into the space between the two casings 13, where radiation causes dissociation and/or activation, producing active particles of Cl* and NO*; these are carried by the vehicle through the perforations 14 into the reaction zone, where cycloalkane is added through one pipe 4 and hydrochloric acid through another 6.

FIG. 3 shows a fourth embodiment, which is particularly recommended. This involves a perforated casing 15 surrounding each lamp 3. The nitrosating agent, alone or diluted in a vehicle, is fed into the space 16 between the lamp and the perforated casing, at sufficient pressure to prevent any of the reagents in the reaction zone 17 from leaking in. The liquid or dissolved cycloalkane is fed into the reactor through one pipe 4, and the hydrochloric acid through another 6. In this apparatus the nitrosyl chloride is dissociated by radiation in the space between the lamp and diffusion screen or perforated casing, and oximation occurs in the actual reaction zone, after diffusion of the active particles through the space between the casing and outer wall of the reactor.

The length of time the active particles remain in the radiation zone depends on the pressure, the distance between the surface of the lamp and the perforated casing, and the transparency of the casing.

The amount of transparency, or perforated area in relation to the total surface area of the casing, and the average diameter of the perforations, can also vary widely, reaching as much as 50 percent.

If T is the amount of transparency of the perforated casing, T percent of the light energy emitted may be assumed to pass into the reaction zone, where a secondary process is brought about by injecting enough nitrosating agent to use it. The agent is thus injected simultaneously into the annular space between light source and casing, and into the reaction zone, ensuring maximum utilization of the photon emitted by the lamp.

The yield is also increased because ClNO molecules that escape into the reaction zone before dissociation has occurred and $Cl_2$ molecules resulting from recombination of active chlorine ions can be re-dissociated by means of the light energy reaching the reaction zone, and react with the cycloalkane.

It has also been found that the field from some photochemical reactions is better when the radiation source functions with alternating periods of illumination and extinction in a zone adjoining the grid. The perforated casing enables this alternation to be reproduced along the path of the active particles.

Finally, the spectral distribution in the reaction zone is not necessarily the same as in the space inside the perforated casing, since the shorter wavelengths tend to be absorbed before passing into the reaction zone, which thus receives longer wavelengths that are less harmful to the oxime. Absorption in the radiation zone increases with the concentration of nitrosating agent, and with the distance between lamp and casing.

The invention is illustrated by, without being confined to, the following examples.

EXAMPLE 1

Description of the Apparatus

FIG. 3 shows a reactor with a perforated inner casing, 15, cut away to reveal the lamp. This cylindrical casing in 47 mm in diameter and 110 mm high, and is made of a corrosion-resistant material such as stainless steel, nickel, titanium, or any other suitable alloy. It may also be of sintered aluminum or refractory material, or consist of a metal base coated with a fluoro carbon polymer, or of an optically transparent fluoro carbon polymer. The number of perforations varies from 100 to 10,000 per square cm, and they may cover from 5 to 50 percent of the total surface-area of the casing.

The use of electroformed nickel or alloy grids is particularly recommended. These have the advantage of reflecting all the photons produced, whereas hydrophobic coatings such as fluoro carbon polymers and silicones absorb them.

The cross-sectional area of the perforations may be of any geometrical form. The casing 15 is held at the base in a machined polytetrafluorethylene support 18, attached by a system of machined rings, joints and flanges 19, also made of fluoro carbon polymer.

The nitrosyl chloride 8, alone or mixed with a gas vehicle, is injected into the annular space between the lamp cover and the perforated casing through a pipe 20 and bent connection 21.

The energy source 3 is a 450 W high-pressure mercury lamp, 11 mm in diameter, 110 mm long, with a cover 40 mm in diameter.

This unit is placed inside a reactor 17, 450 mm high and 110 mm in diameter.

To perform the process, the pressure in the space between the light source and perforated casing is raised by injecting a gas vehicle, to prevent any subsequent infiltration of the reaction mixture. When the pressure is high enough, nitrosyl chloride 8 is injected through the pipe 20, and the reaction mixture through another pipe 4, the amount being adjusted so as not to rise above the top of the perforated casing. The light source is switched on. Hydrochloric acid is added through another pipe 6, and the oxime hydrochloride that forms is extracted through the base of the reactor 22.

EXAMPLE 2

Cyclohexane is fed continuously into the reactor described in Example 1, using a perforated casing with 23 percent transparency.

16 litres of ClNO an hour circulate between the lamp cover and casing, in a gas vehicle such as anhydrous hydrochloric acid mixed with nitrogen, at a rate of 11.5 litres an hour.

Liquid cyclohexane is fed into the reactor at a rate of 150 g an hour, saturated with anhydrous hydrochloric acid, injected separately.

The reaction mixture is kept at a temperature of 15°C.

The reactor produces 100 g of oxime an hour, and the reaction can be performed continuously, without the lamp becoming dirty.

EXAMPLE 3

The process is repeated as in Example 2, using a perforated casing with 23 percent transparency, except that ClNO is simultaneously injected into the reaction zone at a rate of 10 litres an hour, to use up the light energy reaching the reaction zone through the 23 percent transparency.

The oxime output rises to 139 g an hour.

EXAMPLE 4

A 20 percent solution of cyclododecane in carbon tetrachloride is injected at a rate of 300 g of cyclododecane an hour. The flow and pressure of ClNO and HCl are the same as for Example 2. 200 g of oxime an hour are obtained.

EXAMPLE 5

The process is repeated as in Example 4, but using molten cyclododecane, which is injected at a rate of 300 g an hour. The reaction temperature is between 65° and 70°C. ClNO is simultaneously injected into the reaction zone as in Example 3. The oxime output is 250 g an hour.

What is claimed is:

1. A photochemical reactor comprising a first zone adapted to receive a gaseous reagent and a second zone adapted to receive a liquid reaction medium, said zones being separated by a gas-permeable partition, and light source associated with said first zone and out of contact with said second zone, whereby gaseous reagent is dissociated into activated radicals in said first zone by said light source and said activated radicals pass through said gas-permeable partition into said liquid reaction medium in said second zone.

2. The photochemical reactor of claim 1 wherein one of said zones is positioned around the other of said zones.

3. The photochemical reactor of claim 2 wherein a first zone is an inner zone and a second zone is the outer zone separated from said inner zone by a cylindrical gas-permeable partition, and said light source is coaxially positioned within said inner zone.

4. The photochemical reactor of claim 3 wherein said inner zone includes electrical connections for said light source and has an inlet pipe for said gaseous reagent.

5. The photochemical reactor of claim 3 having plurality of first zones within said second zone, each of said first zones having a light source positioned therein and each of said first zones being separated from said second zone by a gas-permeable partition.

6. The photochemical reactor of claim 2 wherein said first zone is an outer zone by a cylindrical gas-permeable partition, and said light source is positioned outside said outer zone.

7. The photochemical reactor of claim 2 wherein said first zone is an outer zone and said second is an inner zone separated from said outer zone by a cylindrical gas-permeable membrane, and said light source is positioned within said outer zone.

* * * * *